(12) United States Patent
Pan et al.

(10) Patent No.: US 12,332,269 B2
(45) Date of Patent: *Jun. 17, 2025

(54) INERTIAL MEASUREMENT UNIT AND MOVABLE DEVICE USING THE SAME

(71) Applicant: SZ DJI TECHNOLOGY CO., LTD., Shenzhen (CN)

(72) Inventors: Guoxiu Pan, Shenzhen (CN); Yonggen Wang, Shenzhen (CN); Yun Yu, Shenzhen (CN); Peng Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,822

(22) Filed: Nov. 20, 2023

(65) Prior Publication Data

US 2024/0085447 A1  Mar. 14, 2024

Related U.S. Application Data

(63) Continuation of application No. 17/818,354, filed on Aug. 8, 2022, now Pat. No. 11,821,908, which is a
(Continued)

(51) Int. Cl.
*G01P 1/00* (2006.01)
*G01C 19/04* (2006.01)
(Continued)

(52) U.S. Cl.
CPC .............. *G01P 1/006* (2013.01); *G01C 19/04* (2013.01); *G01C 21/12* (2013.01); *G01C 21/16* (2013.01);
(Continued)

(58) Field of Classification Search
CPC . G01P 1/006; G01P 1/02; G01P 1/023; G01C 19/04; G01C 21/12; G01C 21/16; G01C 21/166
(Continued)

(56) References Cited

U.S. PATENT DOCUMENTS 7,040,922 B2  5/2006  Harney et al.
8,474,614 B2  7/2013  Hanson et al.
(Continued)

FOREIGN PATENT DOCUMENTS

CN  101025635 A  8/2007
CN  201116875 Y  9/2008
(Continued)

OTHER PUBLICATIONS

The World Intellectual Property Organization (WIPO) International Search Report for PCT/CN2015/093350 Aug. 8, 2016 9 Pages (including translation).

*Primary Examiner* — Robert R Raevis
(74) *Attorney, Agent, or Firm* — ANOVA LAW GROUP, PLLC (57) ABSTRACT

An inertial measurement unit (IMU) device includes an IMU sensor, a controller, a temperature sensor electrically connected to the controller, a heat source, and a heat conductive member. The controller is configured to, in response to a temperature of the IMU sensor detected by the temperature sensor falling below a threshold temperature, control the heat source to generate heat. The heat conductive member is configured to transfer heat from the heat source to the IMU sensor, and includes an electrically insulating and thermally conductive material.

18 Claims, 4 Drawing Sheets

Related U.S. Application Data continuation of application No. 17/020,128, filed on Sep. 14, 2020, now Pat. No. 11,408,905, which is a continuation of application No. 15/964,828, filed on Apr. 27, 2018, now Pat. No. 10,788,508, which is a continuation of application No. PCT/CN2015/093350, filed on Oct. 30, 2015.

(51) Int. Cl.
*G01C 21/12* (2006.01)
*G01C 21/16* (2006.01)
*G01P 1/02* (2006.01)

(52) U.S. Cl.
CPC .............. *G01C 21/166* (2020.08); *G01P 1/02* (2013.01); *G01P 1/023* (2013.01)

(58) Field of Classification Search
USPC ................ 73/497, 493, 431, 514.01, 514.02, 73/514.16–514.34
See application file for complete search history.

(56) References Cited

U.S. PATENT DOCUMENTS

| | | | |
|---|---|---|---|
| 10,788,508 B2 * | 9/2020 | Pan | G01C 19/04 |
| 11,408,905 B2 * | 8/2022 | Pan | G01C 21/16 |
| 11,821,908 B2 * | 11/2023 | Pan | G01C 21/16 |
| 2002/0135414 A1 | 9/2002 | McCall et al. | |
| 2009/0039881 A1 | 2/2009 | Kitching et al. | |
| 2015/0177271 A1 | 6/2015 | Kim | |
| 2017/0024204 A1 | 1/2017 | Bradbury | |

FOREIGN PATENT DOCUMENTS

| | | | |
|---|---|---|---|
| CN | 202074979 U | | 12/2011 |
| CN | 102346162 A | * | 2/2012 |
| CN | 102424196 A | | 4/2012 |
| CN | 202272361 U | | 6/2012 |
| CN | 202274882 U | | 6/2012 |
| CN | 103034265 A | | 4/2013 |
| CN | 202929500 U | * | 5/2013 |
| CN | 103171831 A | | 6/2013 |
| CN | 103412592 A | | 11/2013 |
| CN | 203952612 U | | 11/2014 |
| CN | 104417831 A | | 3/2015 |
| CN | 103210280 B | | 6/2015 |
| CN | 204426727 U | | 7/2015 |
| CN | 104913778 A | | 9/2015 |
| CN | 104931054 A | | 9/2015 |
| CN | 204694263 U | | 10/2015 |
| CN | 204730844 U | | 10/2015 |
| JP | H109889 A | | 1/1998 |
| JP | 2005308689 A | | 11/2005 |

* cited by examiner

INERTIAL MEASUREMENT UNIT AND MOVABLE DEVICE USING THE SAME

CROSS-REFERENCE TO RELATED APPLICATIONS

This application is a continuation of U.S. patent application Ser. No. 17/818,354, filed on Aug. 8, 2022, which is a continuation of U.S. patent application Ser. No. 17/020,128, filed on Sep. 14, 2020, now U.S. Pat. No. 11,408,905, which is a continuation application of U.S. patent application Ser. No. 15/964,828 filed on Apr. 27, 2018, now U.S. Pat. No. 10,788,508, which is a continuation application of International Application No. PCT/CN2015/093350 filed on Oct. 30, 2015, the entire contents of all of which are incorporated herein by reference.

TECHNICAL FIELD

The present disclosure relates to an inertial measurement unit (IMU), and more particularly to an IMU and a movable device using the IMU.

BACKGROUND OF THE DISCLOSURE

Consumer unmanned aerial vehicles (UAVs) have been widely used in various applications. Consumer UAVs are equipped with consumer Micro-ElectroMechanical System (MEMS) sensors. The characteristics of consumer MEMS sensors may be significantly influenced by a temperature drift, thus a temperature calibration is needed. A calibration of temperature drift of MEMS sensors over a full temperature range can be time-consuming and inefficient. In addition, operating in an ever changing ambient temperature, the MEMS sensors may not provide stable and optimal characteristics.

SUMMARY OF THE DISCLOSURE

There is a need for an inertial measurement unit (IMU) having a constant temperature heating functionality.

In addition, there is a need for a movable device having the IMU.

An aspect of the disclosure provides an inertial measurement unit (IMU) comprising one or more sensors and a heat preservation system configured to maintain said one or more sensors at a preset temperature. The heat preservation system can comprise a heat preservation body and a plurality of heat sources. The one or more sensors can be positioned on the heat preservation body. The heat preservation system can generate a heat using the plurality of heat sources and transfers the heat generated from the plurality of heat sources to the one or more sensors through the heat preservation body, such that the preset temperature can be maintained surrounding the one or more sensors.

In some embodiments, the IMU can further comprise a circuit board assembly, the circuit board assembly comprising a main body and an extension extending from a side of the main body.

In some embodiments, the main body can be a hollow frame formed by connecting a plurality of flexible circuit boards and a plurality of rigid circuit boards.

In some embodiments, the heat preservation body can be a polyhedral frame having a high thermal conductivity. A shape of the heat preservation body can correspond to a shape of the main body of the IMU such that the heat preservation body can be accommodated within the main body of the IMU.

In some embodiments, the plurality of heat sources can be provided on and electrically connected to the circuit board assembly. The plurality of heat sources can be disposed on a sidewall of the heat preservation body.

In some embodiments, the plurality of heat sources can be disposed on two opposing sidewalls of the heat preservation body. A groove can be provided on one or more sidewalls of the heat preservation body, such that the one or more sensors can be embedded in the groove provided on one or more sidewalls of the heat preservation body, which one or more sidewalls being adjacent to the two opposing sidewalls on which the plurality of heat sources can be disposed.

In some embodiments, the plurality of heat sources disposed on the two opposing sidewalls of the heat preservation body can be evenly distributed on a periphery of each of the sidewalls.

In some embodiments, the heat preservation body can be made of a metal having a high thermal conductivity. The IMU can further comprise a heat conductive member. The heat conductive member can be filled between the plurality of heat sources and the heat preservation body and between the one or more sensors and the heat preservation body to transfer a heat.

In some embodiments, the heat conductive member can be an electrically insulating and thermally conductive silicone.

In some embodiments, the heat preservation body can be enclosed within the main body of the circuit board assembly, such that the plurality of heat sources can be brought into contact with the heat conductive member, where the heat conductive member is fixed in advance to a sidewall of the heat preservation body to be evenly distributed on two opposing side walls of the heat preservation body, such that the heat can be transferred to the heat preservation body.

In some embodiments, the heat preservation body can be a hexahedral frame. The heat preservation system can further comprise a plurality of insulation plates including a first insulation plate and a second insulation plate provided in a first direction and a third insulation plate and a fourth insulation plate provided in a second direction perpendicular to the first direction. The first insulation plate and the second insulation plate can sandwich the main body of the IMU in the first direction. The third insulation plate and the fourth insulation plate can sandwich the main body of the IMU in the second direction.

In some embodiments, the first insulation plate can comprise a rectangular base plate and a first sidewall and a second sidewall respectively extending downwardly and perpendicularly from two opposing sides of the rectangular base plate. The second insulation plate can comprise a rectangular base plate and a third sidewall and a fourth sidewall respectively extending upwardly and perpendicularly from two opposing sides of the rectangular base plate. The third insulation plate can comprise a rectangular base plate and a first stopper and a second stopper respectively extending rightward and perpendicularly from a middle of two opposing sides of the rectangular base plate. The fourth insulation plate can comprise a rectangular base plate and a third stopper and a fourth stopper respectively extending leftward and perpendicularly from a middle of two opposing sides of the rectangular base plate.

In some embodiments, a sum of a width of the first sidewall, a width of the third sidewall and a width of the first stopper can be substantially equal to a length of the main body in the first direction. A sum of a length of the first stopper and a length of the third stopper can be substantially equal to a length of the main body in the second direction.

In some embodiments, the IMU can further comprise a first rubber piece, a second rubber piece and a casing. The first rubber piece can be fitted onto the first insulation plate and the second rubber piece can be fitted onto the second insulation plate. The casing can integrate the first rubber piece, the second rubber piece and the main body as one piece.

In some embodiments, a top of an inner wall of the first rubber piece can be grid-like, and a bottom of an inner wall of the second rubber piece can be grid-like.

In some embodiments, the first rubber piece can comprise a rectangular rubber base plate and four sidewalls respectively extending downwardly and perpendicularly from four sides of the rubber base plate. The second rubber piece can comprise a rectangular rubber base plate and four sidewalls respectively extending upwardly and perpendicularly from four sides of the rubber base plate. The casing can comprise a rectangular base plate and four sidewalls respectively extending downwardly and perpendicularly from four sides of the rectangular base plate.

In some embodiments, a notch can be provided on each of the four sidewalls of the casing. An opening can be provided on one sidewall of the casing from which the extension of the IMU can extend out.

Another aspect of the disclosure provides a movable device comprising an inertial measurement unit (IMU) described hereinabove.

Another aspect of the disclosure provides an inertial measurement unit (IMU) comprising a circuit board assembly having a main body. The IMU can further comprise a cushioning piece configured to be fitted onto the main body to clamp the main body.

In some embodiments, the cushioning piece can comprise a first rubber piece and a second rubber piece respectively fitted onto two opposite ends of the main body.

In some embodiments, a bottom of an inner wall of the second rubber piece can be grid-like, and a top of an inner wall of the first rubber piece can be grid-like.

In some embodiments, the IMU can further comprise a casing configured to integrate the cushioning piece and the main body as one piece.

In some embodiments, the main body of the circuit board assembly can be a hollow rectangular frame formed by connecting a plurality of flexible circuit boards and a plurality of rigid circuit boards. The first rubber piece can comprise a rectangular rubber base plate and four sidewalls respectively extending downwardly and perpendicularly from four sides of the rubber base plate. The second rubber piece can comprise a rectangular rubber base plate and four sidewalls respectively extending upwardly and perpendicularly from four sides of the rubber base plate. The casing can comprise a rectangular base plate and four sidewalls respectively extending downwardly and perpendicularly from four sides of the rectangular base plate.

In some embodiments, the circuit board assembly can further comprise an extension extending from a side of the main body. An opening can be provided on one sidewall of the casing from which the extension of the IMU can extend out.

In some embodiments, a notch can be provided on each of the four sidewalls of the casing.

In some embodiments, the IMU can further comprise a plurality of insulation plates including a first insulation plate and a second insulation plate provided in a first direction and a third insulation plate and a fourth insulation plate provided in a second direction perpendicular to the first direction. The first insulation plate and the second insulation plate can sandwich the main body of the IMU in the first direction. The third insulation plate and the fourth insulation plate can sandwich the main body of the IMU in the second direction.

In some embodiments, the first rubber piece can be fitted onto the first insulation plate, and the second rubber piece can be fitted onto the second insulation plate.

Another aspect of the disclosure further provides a movable device comprising an inertial measurement unit (IMU) described hereinabove.

As compared with the prior art, in the inertial measurement unit (IMU) described hereinabove, an interior of the IMU can be heated efficiently and stably to a constant temperature, such that defects in the prior art including a low heating efficiency, a poor temperature control effect and an impact of an adhesive stress can be effectively solved. With the heat preservation system of the IMU, the sensors of the IMU can be maintained at the constant temperature and operate with a satisfactory performance in various external environments.

LIST OF REFERENCE NUMERALS

TABLE 1

| | |
|---|---|
| Inertial measurement unit (IMU) | 100 |
| Circuit board assembly | 101 |
| Main body | 1010 |
| Extension | 1011 |
| Sensor | 102 |
| Groove | 103 |
| Heat preservation body | 201 |
| Heat conductive member | 202 |
| Heat source | 203 |
| First insulation plate | 304a |
| First sidewall | 305a |
| Second sidewall | 306a |
| Second insulation plate | 304b |
| Third sidewall | 305b |
| Fourth sidewall | 306b |
| Third insulation plate | 304c |
| First stopper | 305c |
| Second stopper | 306c |
| Fourth insulation plate | 304d |
| Third stopper | 305d |
| Fourth stopper | 306d |
| Casing | 401 |
| Cushioning piece | 402 |
| First rubber piece | 402a |
| Second rubber piece | 402b |
| Opening | 403 |
| Notch | 404 |
| Fastener | 501 |

Illustrative embodiments will be described in more detail by reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that the embodiments described herein are merely provided by way of example only. Those skilled in the art can conceive other embodiments in light of those embodiments disclosed herein without inventive efforts, and all these embodiments are within the scope of the disclosure.

Illustrative embodiments of the disclosure will be described with reference to the drawings. The embodiments and features can be combined with one another provided that they are technically compatible.

Figure 1:
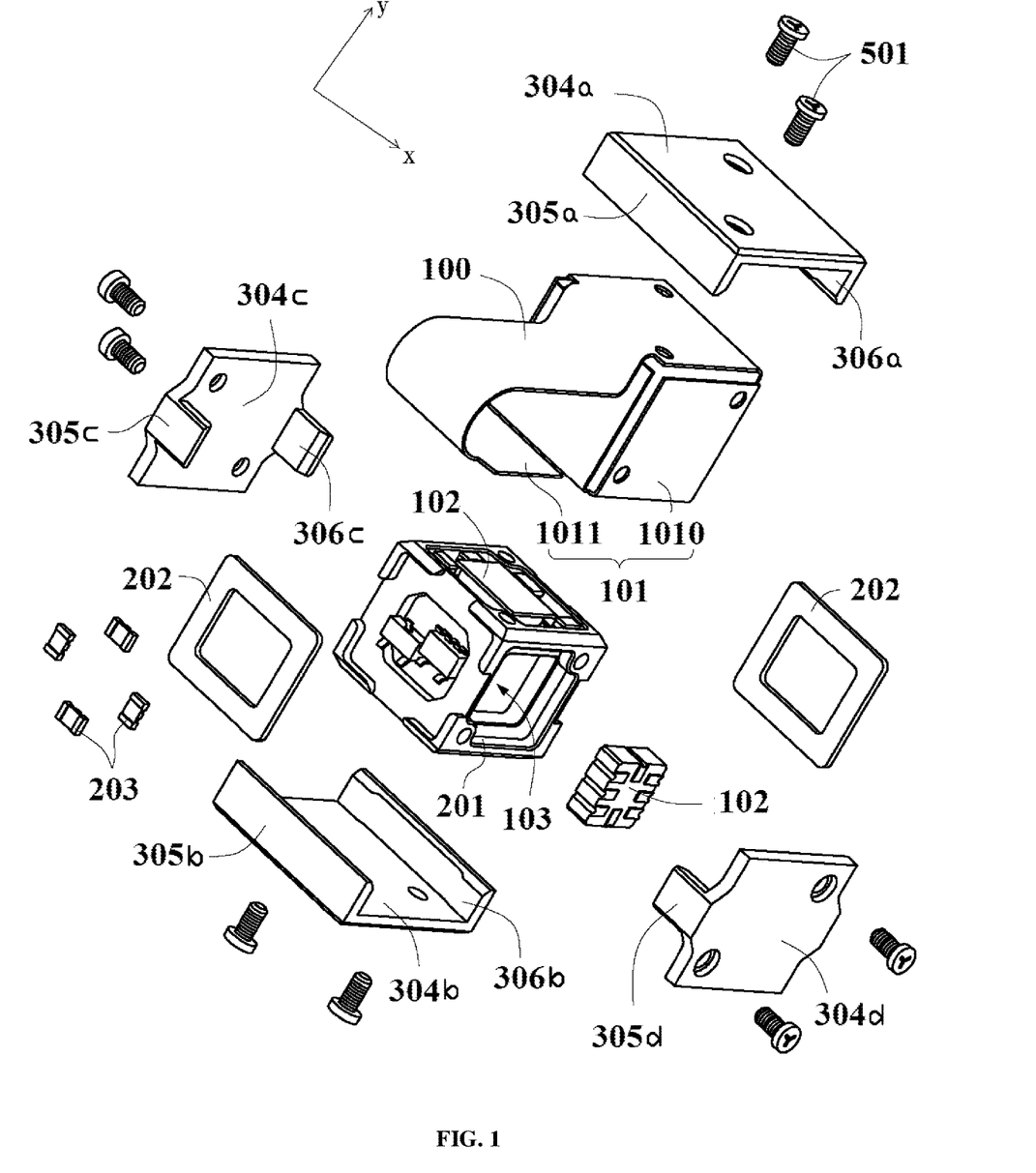
FIG. 1 shows an exploded view of an inertial measurement unit (IMU) in accordance with a first embodiment of the disclosure.

FIG. 1 shows an exploded view of an inertial measurement unit (IMU) 100 in accordance with a first embodiment of the disclosure is shown. The IMU 100 can at least comprise one or more sensors 102 (two sensors are shown), a circuit board assembly 101, a heat preservation body 201, a heat conductive member 202 and a plurality of heat sources 203. In some embodiments, the heat preservation body 201, the heat conductive member 202 and the plurality of heat sources 203 can serve as a heat preservation system of the IMU 100 for providing a preset temperature to the sensors 102.

In some embodiments, the sensor 102 can be a motion sensor (for example, a velocity sensor, such as a microelectromechanical system (MEMS) accelerometer) and/or an attitude sensor (for example, a two-axis/three-axis gyroscope). In some embodiments, the sensors 102 can comprise two accelerometers and two gyroscopes.

The circuit board assembly 101 can comprise a main body 1010 and an extension 1011. The extension 1011 can extend from a side of the main body 1010. The main body 1010 can comprise a plurality of flexible circuit boards and a plurality of rigid circuit boards which are coupled to one another. Two adjacent rigid circuit boards can be connected by a flexible circuit board. The main body 1010 can be folded to enclose a hollow frame. In some embodiments, the rigid circuit boards can be PCB boards. In some embodiments, various electronic elements configured to implement various functionalities of the IMU 100 can be provided on an inner surface of the main body 1010. In some embodiments, the main body 1010 can be provided as a rectangular frame.

Figure 2:
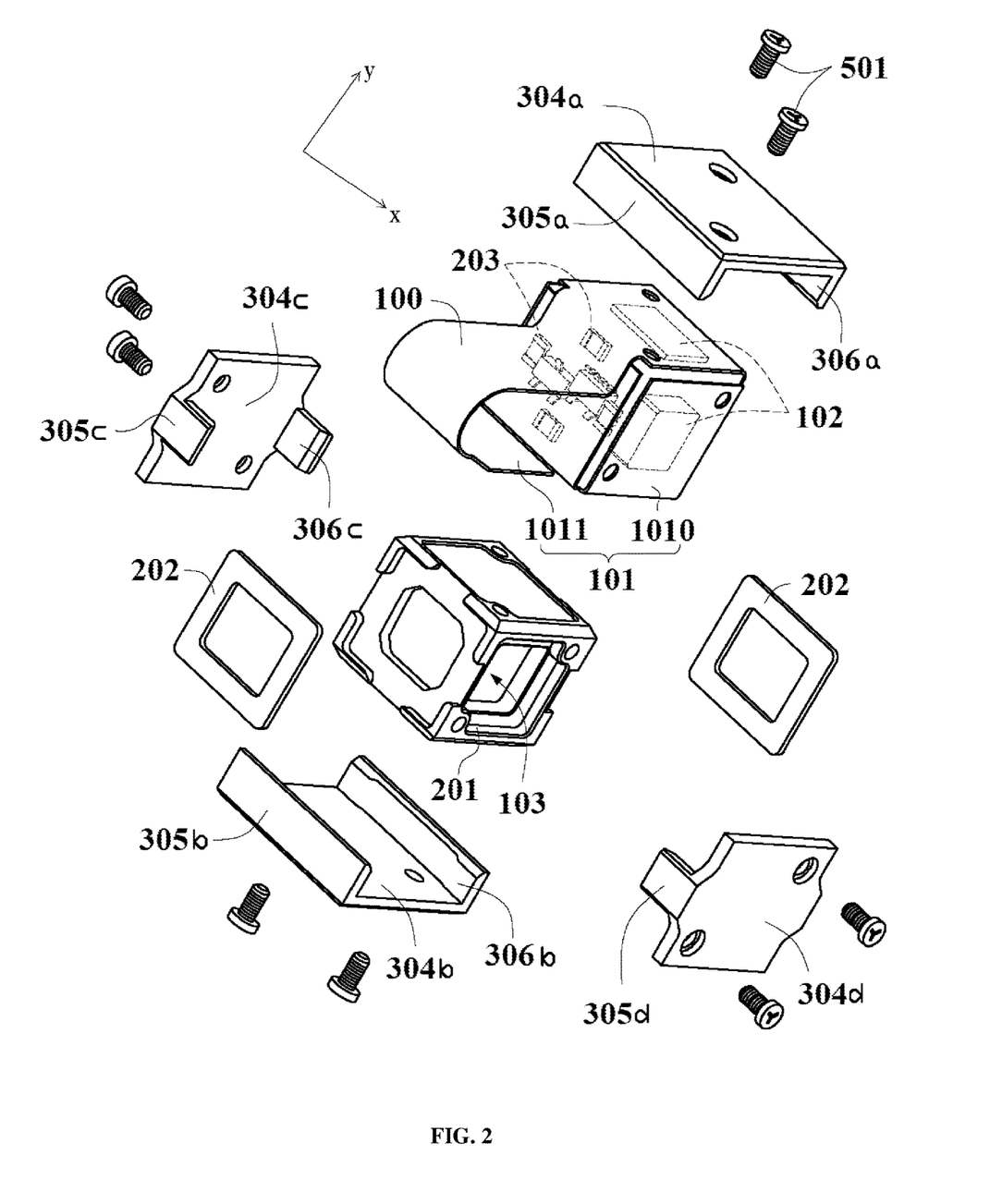
FIG. 2 shows positions of a heat source and a sensor of an IMU in accordance with embodiments of the disclosure.

In some embodiments, the sensor 102 can be disposed on the main body 1010 of the circuit board assembly 101 (for example, the sensor 102 can be disposed on the rigid circuit board of the main body 1010) and electrically connected to the circuit board assembly 101. The sensor 102 can be provided within the heat preservation body 201. Referring to FIG. 2, the sensor 102 can be disposed on the inner surface of the main body 1010 of the circuit board assembly 101.

The extension 1011 can electrically connect the sensor 102 to external elements (not shown) to transmit signals and/or power between the sensors 102 and the external elements. In some embodiments, the extension 1011 can be a flexible circuit board to facilitate a connecting to the external elements.

It will be apparent that, the IMU 100 can comprise various functional components including a controller and at least one temperature sensor (not shown). In some embodiments, the controller can be disposed within the main body 1010 of the circuit board assembly 101, and the temperature sensor can be provided within one of the sensors 102 (for example, within at least one of the gyroscopes). Optionally, the controller can be disposed outside the main body 1010 of the circuit board assembly 101 and electrically connected to the temperature sensor by the extension 1011 of the circuit board assembly 101. The temperature sensor can sense an internal temperature of the IMU 100. If the temperature is below a threshold, the controller can direct the plurality of heat sources 203 to generate a heat. The heat can be transferred to the sensors 102 through the heat conductive member 202 and the heat preservation body 201, such that the internal temperature of the IMU 100 can be maintained at a constant temperature. In this way, once a temperature calibration is performed at a single constant temperature, the sensors 102 can be maintained at the constant temperature and operate with a satisfactory performance in various external environments.

In some embodiments, the heat preservation body 201 can be provided as a polyhedral frame having a high thermal conductivity. A shape of the heat preservation body 201 can correspond to (for example, identical or similar to) a shape of the main body 1010, such that the heat preservation body 201 can be accommodated within the main body 1010. In some embodiments, a groove 103 can be provided on each sidewall of the heat preservation body 201, such that the sensor 102 and other electronic elements disposed on the inner surface of the circuit board assembly 101 can be embedded in the heat preservation body 201 once the heat preservation body 201 is enclosed by the main body 1010 of the circuit board assembly 101. In some embodiments, a sidewall of the heat preservation body 201 does not need to include a groove 103 if no sensor 102 or other electronic element is provided on a portion of the main body 1010 that corresponds to the sidewall of the heat preservation body 201.

In some embodiments, the heat preservation body 201 can be made of a metal having a high thermal conductivity, such as aluminum, magnesium, silver or iron. In some embodiments, the heat preservation body 201 can be made of a non-metal (for example, an insulation material). In some embodiments, the heat preservation body 201 can be provided as a hexahedral metal frame as shown in FIG. 1.

The heat conductive member 202 can be a thermally conductive silicone having a suitable shape and thickness. The heat conductive member 202 can be filled between the plurality of heat sources 203 and the heat preservation body 201 and between the sensor 102 and the heat preservation body 201. In some embodiments, the heat conductive member 202 can be an electrically insulating and thermally conductive silicone. In some embodiments, the heat conductive member 202 can be a heat conductive member having a high thermal conductivity, a high adhesion property and an electrical insulation property. The heat generated from the heat source 203 can be transferred to the heat preservation body 201 through the heat conductive member 202. Meanwhile, the heat source 203 can be electrically insulated from the heat preservation body 201. The heat can be transferred from the heat preservation body 201 to the sensor 102 through the heat conductive member 202. Meanwhile, the heat preservation body 201 can be electrically insulated from the sensors 102. The heat preservation body 201 and the heat conductive member 202 can serve as a thermal conducting layer of the IMU 101. The heat generated from the plurality of heat sources 203 can be transferred to the sensors 102 through the heat preservation body 201 and the heat conductive member 202, such that the preset temperature can be maintained in a surrounding of the sensor 102.

It will be appreciated that, the heat conductive member 202 can be omitted if the heat preservation body 201 is not made of a metal. In this case, the heat preservation body 201 can be made of an insulation material having a high thermal conductivity.

The plurality of heat sources 203 can be disposed on the heat preservation body 201 for producing heat. In some embodiments, the plurality of heat sources 203 can be provided at a plurality of predetermined positions on the inner surface of the main body 1010 of the circuit board assembly 101 (for example, the heat sources 203 can be provided on the rigid circuit board of the main body 1010) and electrically connected to the circuit board assembly 101. Referring to FIG. 2, the plurality of heat sources 203 can be symmetrically distributed on two opposing sidewalls within the main body 1010.

In some embodiments, the heat conductive member 202 can be fixed to a sidewall of the heat preservation body 201 in advance if the heat preservation body 201 is a polyhedral frame made of metal. When the heat preservation body 201 is enclosed within the main body 1010 of the circuit board assembly 101, the plurality of heat sources 203 can be brought into contact with the heat conductive member 202 and thus be distributed on two opposing sidewalls of the heat preservation body 201 (e.g., sidewalls on which the plurality of heat sources 203 are disposed, hereinafter referred to "heating sidewalls"). The heat generated from the plurality of heat sources 203 can be transferred to the heat preservation body 201 with the heat conductive member 202.

In some embodiments, the plurality of heat sources 203 can be a plurality of heating resistors. In some embodiments, the plurality of heat sources 203 can be provided as any type of heat sources capable of generating heat. The number of the plurality of heat sources 203 can vary in view of an actual structure of the IMU 100.

Referring to FIG. 1, once the heat preservation body 201 is enclosed within the main body 1010 of the circuit board assembly 101, the plurality of heat sources can be evenly distributed on a periphery of each of the two opposing sidewalls of the heat preservation body 201. In some instances, four heat sources 203 can be distributed on each of the two opposing sidewalls of the heat preservation body 201. The four heat sources 203 can be symmetrically arranged on the periphery of the sidewall. It will be appreciated that, the four heat sources 203 do not have to be symmetrically provided. Accordingly, the heat conductive member 202, which is filled between the plurality of heat sources 203 and the heat preservation body 201, can be provided with a hollow polygonal shape to match the distribution of the plurality of heat sources 202. In this way, the heat conductive member 202 can contact with the plurality of heat sources 203 to transfer the heat generated from the heat sources 203 to the heat preservation body 201. The hollow polygonal shape of the heat conductive member 202 can expose the electronic elements disposed on the main body 1010 of the circuit board assembly 101 from the heat conductive member 202.

In some embodiments, the sensor 102 can be disposed at a predetermined position of the main body 1010 of the circuit board assembly 101 to enable an uniform heat transmission from the plurality of heat sources 203 to the sensor 102. For instance, the sensor 102 can be disposed such that the sensor 102 is positioned on the heat preservation body 201 when the heat preservation body 201 is enclosed within the main body 1010 of the circuit board assembly 101. In some instances, the sensor 102 can be embedded in a groove 103 provided on a sidewall of the heat preservation body 201, which sidewall being adjacent to the two opposing heating sidewalls on which the plurality of heat sources 203 are disposed. As shown in FIG. 1, among the hexahedral heat preservation body 201, there are four sidewalls adjacent to the two opposing heating sidewalls on which the plurality of heat sources 203 are disposed. In other words, four sensors 102 can be embedded in the grooves 103 provided on the four sidewalls adjacent to the two opposing heating sidewalls.

In some embodiments, the sensors 102 can comprise a first accelerometer, a second accelerometer, a first gyroscope and a second gyroscope. As shown in FIG. 1, the sensor 102, which can be embedded in a sidewall of the heat preservation body 201, can be the first accelerometer, and the second accelerometer can be embedded in a groove 103 provided on a bottom surface of the hear conducting heat preservation body 201. As shown in FIG. 1, the sensor 102 embedded in a groove 103 provided on a top surface of the heat preservation body 201 can be the first gyroscope, and the second gyroscope can be embedded in a groove 103 provided on a sidewall of the heat preservation body 201 opposite to the sidewall on which the first accelerometer is disposed. The sides on which the sensors 102 are disposed can be adjacent to the two opposing heating sides, such that the heat generated from the plurality of heat sources 203 can be efficiently and uniformly transferred into the sidewalls of the grooves 103 which receive the sensors 102. A structure of the IMU 100 can have a compact structure and a reduced volume by disposing the sensors 102 within the grooves 103.

The heat generated from the plurality of heat sources 203 can be transferred to the heat preservation body 201 through the heat conductive member 202. Subsequently, the heat can be transferred to the sidewalls in which the sensors 102 are embedded through the heat preservation body 201. Then, the heat can be transferred to the sensors 102 through the heat conductive member 202. In some embodiments, if the internal temperature of the IMU 100 as sensed by the temperature sensor of the IMU 100 is below a preset temperature threshold, the controller of the IMU 100 can direct the plurality of heat sources 203 to generate heat. The heat generated from the plurality of heat sources 203 can be efficiently and uniformly transferred to the sensors 102 through a thermal conduction path "the heat sources—the heat conductive member—the heat preservation body—the heat conductive member—the sensors", such that a constant temperature operating environment is created for the sensors 102. In this way, once a temperature calibration is performed at a single constant temperature, the sensors 102 can operate with a satisfactory performance in various external environments.

In some embodiments, the IMU 100 can further comprise a first insulation plate 304a, a second insulation plate 304b, a third insulation plate 304c and a fourth insulation plate 304d. The plurality of insulation plates can enclose the sensors 102, the plurality of heat sources 203, the heat preservation body 201 and the main body 1010 of the circuit board assembly 101.

It will be appreciated that, the four insulation plates as discussed hereinabove are provided where the main body 1010 is a rectangular frame like. In some embodiments, the number of the plurality of insulation plates can vary to fit a shape of the main body 1010. In some embodiments, the first insulation plate 304a, the second insulation plate 304b, the third insulation plate 304c and the fourth insulation plate 304d can serve as a peripheral heat preservation layer enclosing the heat preservation body 201 and the circuit board assembly 101, such that an internal temperature of the IMU 100 can be further maintained constant. In some embodiments, the first insulation plate 304a and the second insulation plate 304b can be provided in a first direction (shown as a y-direction) to sandwich the circuit board assembly 101 of the IMU 100 in the first direction. The third insulation plate 304c and the fourth insulation plate 304d can be provided in a second direction (shown as an x-direction) to sandwich the circuit board assembly 101 of the IMU 100 in the second direction. The first direction can be perpendicular to the second direction. The first insulation plate 304a, the second insulation plate 304b, the third insulation plate 304c and the fourth insulation plate 304d can enclose the main body 1010 of the IMU 100 by clamping the circuit board assembly 101 as discussed hereinabove. The insulation plates can insulate an external heat if an external temperature is high. On the other hand, the insulation plates can maintain a temperature by preventing an heat dissipation from the IMU 100 if the external temperature is low.

In some embodiments, the first insulation plate 304a can comprise a rectangular base plate and a first sidewall 305a and a second sidewall 306a respectively extending downwardly and perpendicularly from two opposing sides of the rectangular base plate. A width of the first sidewall 305a can be identical to a width of the second sidewall 306a. In some embodiments, the width of the first sidewall 305a can be different from the width of the second sidewall 306a. The second insulation plate 304b can comprise a rectangular base plate and a third sidewall 305b and a fourth sidewall 306b respectively extending upwardly and perpendicularly from two opposing sides of the rectangular base plate. A width of the third sidewall 305b can be identical to a width of the fourth sidewall 306b. In some embodiments, the width of the third sidewall 305b can be different from the width of the fourth sidewall 306b. In some embodiments, the widths of the first sidewall 305a, the second sidewall 306a, the third sidewall 305b and the fourth sidewall 306b can be identical.

The third insulation plate 304c can comprise a rectangular base plate and a first stopper 305c and a second stopper 306c respectively extending rightward and perpendicularly from a middle of two opposing sides of the rectangular base plate. A width of the first stopper 305c can be identical to a width of the second stopper 306c. In some embodiments, the width of the first stopper 305c can be different from that of the second stopper 306c. The fourth insulation plate 304d can comprise a rectangular base plate and a third stopper 305d and a fourth stopper 306d (not show in the figures as being blocked) respectively extending leftward and perpendicularly from a middle of two opposing sides of the rectangular base plate. A width of the third stopper 305d can be identical to a width of the fourth stopper 306d, and a length of the third stopper 305d can be identical to a length of the fourth stopper 306d. In some embodiments, the width/length of the third stopper 305d can be different from the width/length of the fourth stopper 306d. In some embodiments, the widths of the first stopper 305c, the second stopper 306c, the third stopper 305d and the fourth stopper 306d can be identical.

In some instances, a sum of the width of the first sidewall 305a, the width of the third sidewall 305b and the width of the first stopper 305c or the third stopper 305d can be substantially equal to or slightly greater than a length of the main body 1010 in the first direction, and the sum of the length of the first stopper 305c and the length of the third stopper 305d can be substantially equal to or slightly greater than a length of the main body 1010 in the second direction. Therefore, a complete enclosure of the circuit board assembly 101 can be effected.

Figure 3:
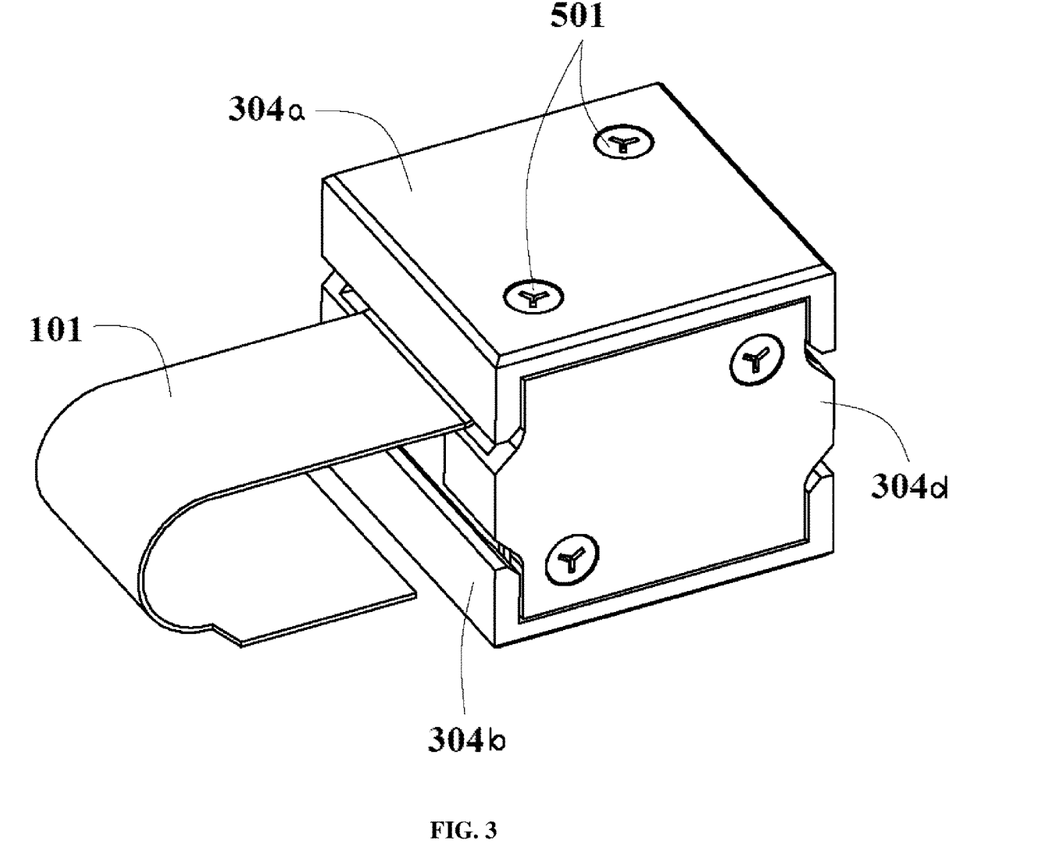
FIG. 3 shows an assembly of an IMU in accordance with some embodiments of the disclosure.

FIG. 3 shows an assembly of an IMU in accordance with some embodiments of the disclosure. In some embodiments, the first insulation plate 304a, the second insulation plate 304b, the third insulation plate 304c and the fourth insulation plate 304d can be integrally fastened to the circuit board assembly 101 of the IMU 100 and the heat preservation body 201 using a plurality of fasteners 501. In some embodiments, the plurality of fasteners 501 can be screws. In some embodiments, the plurality of fasteners 501 can be other types of locking members capable of fastening the IMU 100.

It will be appreciated that, when the plurality of insulation plates, the circuit board assembly 101 and the heat preservation body 201 are assembled using the screws, two or more screw holes can be provided on the rectangular base plates of the insulation plates, and two or more corresponding screw holes can be provided on a corresponding side of the circuit board assembly 101 and the heat preservation body 201, such that the locking screws can pass through those screw holes to effect the fastening. Referring to FIGS. 1-2, in some embodiments, the two screw holes can be provided along a diagonal line of the rectangular base plate of the insulation plate.

In some embodiments, the IMU 100 can be provided to a movable device including a vehicle, a watercraft and an unmanned aerial vehicle (UAV).

Figure 4:
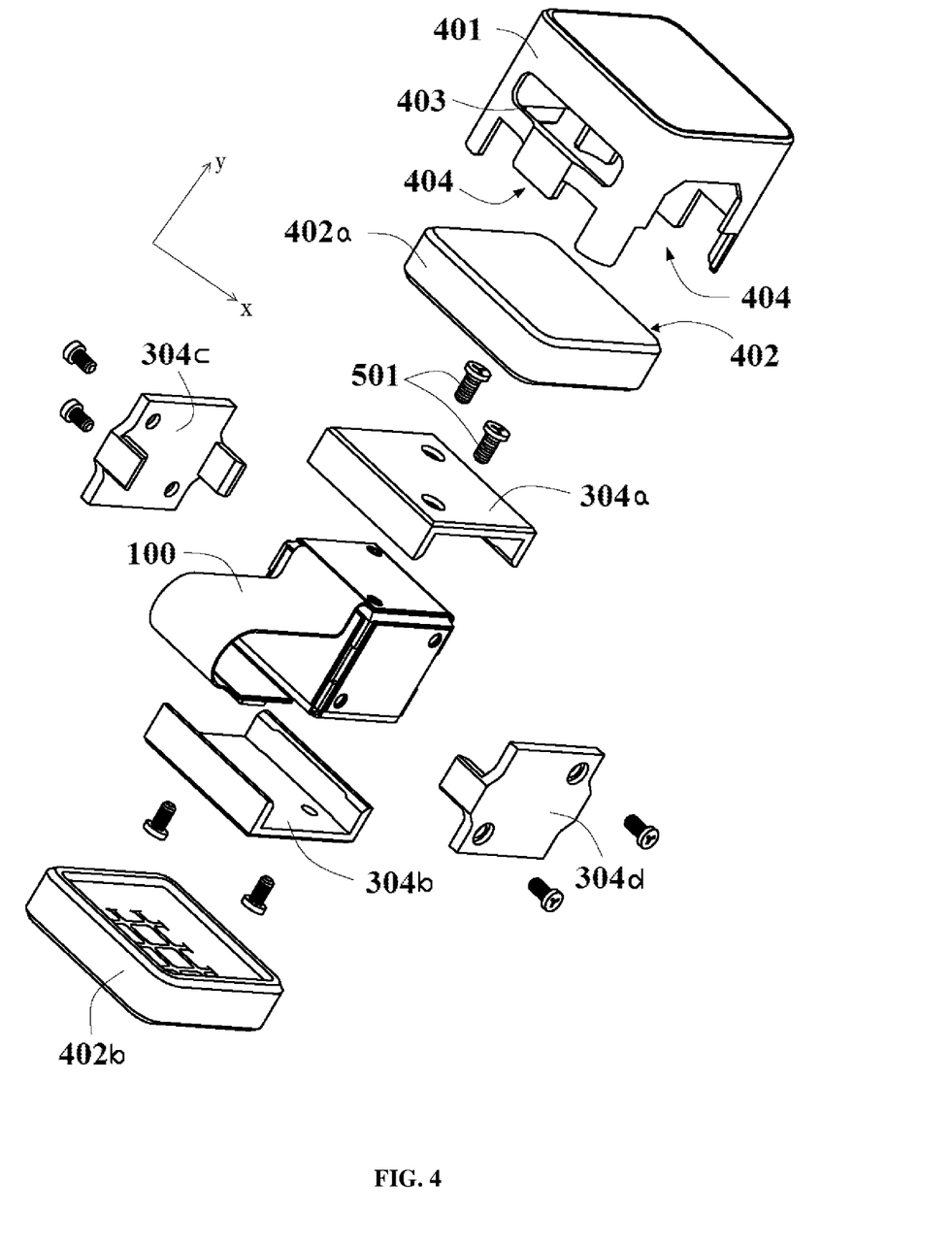
FIG. 4 shows an exploded view of an IMU in accordance with a second embodiment of the disclosure.

FIG. 4 shows an exploded view of an IMU in accordance with a second embodiment of the disclosure is shown. In addition to the configuration of the first embodiment, the IMU 100 in accordance with the second embodiment can further comprise a casing 401 and a cushioning piece 402. In the second embodiment, the heat preservation body 201, the heat conductive member 202 and the plurality of heat sources 203 can be omitted from the IMU 100.

In some embodiments, the cushioning piece 402 can be made of a flexible but tough material to improve a vibration reduction of the IMU 100. In some embodiments, the cushioning piece 402 can comprise a first rubber piece 402a and a second rubber piece 402b. In some embodiments, the first rubber piece 402a can comprise a rectangular rubber base plate and four sidewalls extending downwardly and perpendicularly from four sides of the rubber base plate. For instance, the first rubber piece 402a can be a rectangular cover like. The second rubber piece 402b can comprise a rectangular rubber base plate and four sidewalls extending upwardly and perpendicularly from four sides of the rubber base plate. For instance, second rubber piece 402b can be a rectangular cover like. In some embodiments, a shape of the rubber base plates of the first rubber piece 402a and the second rubber piece 402b can vary to fit the shape of the main body 1010, as long as the first rubber piece 402a and the second rubber piece 402b can be fitted onto the main body 1010. The first rubber piece 402a can be fitted onto the first insulation plate 304a. The second rubber piece 402b can be fitted onto the second insulation plate 304b.

In some embodiments, the casing 401 can be fitted onto the first rubber piece 402a and the second rubber piece 402b, such that the first rubber piece 402a, the second rubber piece 402b and the IMU 100 can be integrated as one piece. The circuit board assembly 101 of the IMU 100 can be completely enclosed using the first insulation plate 304a, the second insulation plate 304b, the third insulation plate 304c, the fourth insulation plate 304d, the casing 401, the first rubber piece 402a and the second rubber piece 402b. Therefore, heat can be insulated from surrounding environment, and meanwhile, a heat dissipation from the IMU 100 can be prevented.

In some embodiments, a bottom of an inner wall of the second rubber piece 402b and a top of an inner wall of the first rubber piece 402a can be grid-like. The grids can be soft and deformable therebetween. The casing 401 can comprise a rectangular base plate and four sidewalls respectively extending downwardly and perpendicularly from four sides of the rectangular base plate. A notch 404 can be provided on each of the four sidewalls to facilitate a fitting of the casing 401 onto the cushioning piece 402 or a removal the casing 401 from the cushioning piece 402. In some embodiments, an opening 403 can be provided on one sidewall of the casing 401 from which the extension 1011 of the IMU 100 can extend out. With the first insulation plate 304a, the second insulation plate 304b, the third insulation plate 304c, the fourth insulation plate 304d, the casing 401, the first rubber piece 402a and the second rubber piece 402b, an internal temperature of the IMU 100 can be maintained constant while a vibration reduction of the IMU 100 can be further improved.

It will be appreciated that, a length of the casing 401 in the first direction (shown as y-direction, a direction perpendicular to the first insulation plate 304a) can be identical to a length of the main body 1010 of the IMU 100 in the first direction, such that the first rubber piece 402a and the second rubber piece 402b are prevented from detaching from the IMU 100 under vibration and the IMU 100 can be better positioned. In this way, an accuracy in assembling the IMU 100 can be improved.

In some embodiments, the first rubber piece 402a and the second rubber piece 402b can be fitted respectively onto two opposite ends of the main body 1010, such that the main body 1010 can be sandwiched between the first rubber piece 402a and the second rubber piece 402b. In some embodiments, the first rubber piece 402a and the second rubber piece 402b can directly abut each other, such that the main body 1010 can be completely enclosed. In some embodiments, the first rubber piece 402a and the second rubber piece 402b can be separated by a distance.

The above description merely illustrates some embodiments of the disclosure and is not intended to limit the scope of the disclosure. Any equivalent changes in structures or processes made in light of the specification and the drawings, and their direct or indirect application in other related technical fields should all be encompassed in the scope of the present disclosure.

What is claimed is:

1. An inertial measurement unit (IMU) device comprising:
    an IMU sensor;
    a heat source;
    a temperature sensor;
    a controller configured to, in response to a temperature of the IMU sensor detected by the temperature sensor falling below a threshold temperature, control the heat source to generate heat; and
    a heat conductive member configured to transfer heat from the heat source to the IMU sensor, wherein the heat conductive member includes an electrically insulating and thermally conductive material;
    wherein the heat conductive member is filled between the heat source and the IMU sensor.

2. The IMU device of claim 1, further comprising:
    a circuit board assembly including at least a circuit board;
    wherein the IMU sensor is located at the circuit board.

3. The IMU device of claim 2, wherein:
    the circuit board assembly includes a rigid circuit board and a flexible circuit board electrically connected together.

4. The IMU device of claim 3, wherein:
    the IMU sensor is disposed on the rigid circuit board, the IMU sensor being electrically connected to the flexible circuit board to transmit at least one of a signal or power.

5. The IMU device of claim 4, further comprising:
    an opening provided at a sidewall of a casing of the IMU device.

6. The IMU device of claim 3, wherein:
    the heat source is arranged at the rigid circuit board and electrically connected to the circuit board assembly.

7. The IMU device of claim 6, wherein:
    the heat source includes a plurality of heating members, and the heating members are distributed at the rigid circuit board.

8. The IMU device of claim 1, wherein:
    the controller is further configured to maintain a preset temperature in a surrounding of the IMU sensor.

9. The IMU device of claim 1, wherein:
    the IMU sensor is located near the heat source.

10. The IMU device of claim 1, wherein:
    the electrically insulating and thermally conductive material includes silicone.

11. The IMU device of claim 1, further comprising:
    a cushioning member configured to reduce vibration of the IMU device.

12. An inertial measurement unit (IMU) device comprising:
    a circuit board assembly;
    an IMU sensor;
    a heat source configured to generate heat; and
    a heat conductive member configured to transfer heat from the heat source to the IMU sensor;
    wherein:
        the IMU sensor and the heat source are disposed on the circuit board assembly;
        the heat conductive member includes an electrically insulating and thermally conductive material; and
        the heat conductive member is filled between the heat source and the IMU sensor.

13. The IMU device of claim 12, further comprising:
    a controller; and
    a temperature sensor electrically connected to the controller;
    wherein the controller is configured to, in response to a temperature of the IMU sensor detected by the temperature sensor falling below a threshold temperature, control the heat source to generate heat.

14. The IMU device of claim 13, wherein:
    the heat source includes a plurality of heating members, and the heating members are arranged near the IMU sensor.

15. A movable device comprising:
    an inertial measurement unit (IMU) device including:
        a circuit board assembly;
        an IMU sensor positioned at the circuit board assembly;
        a heat source configured to generate heat;
        a heat conductive member configured to transfer heat from the heat source to the IMU sensor to maintain the IMU sensor at a preset temperature; and
        a cushioning member configured to reduce vibration of the IMU device;
        wherein the heat conductive member includes an electrically insulating and thermally conductive material.

16. The movable device of claim 15, wherein:
the circuit board assembly includes a rigid circuit board and a flexible circuit board electrically connected together.

17. The movable device of claim 16, wherein:
the IMU sensor is disposed on the rigid circuit board, the IMU sensor being electrically connected to the flexible circuit board to transmit at least one of a signal or power.

18. The movable device of claim 15, further comprising:
a controller; and
a temperature sensor electrically connected to the controller;
wherein the controller is configured to, in response to a temperature of the IMU sensor detected by the temperature sensor falling below a threshold temperature, control the heat source to generate heat.

\* \* \* \* \*